(12) United States Patent
Elkouh et al.

(10) Patent No.: US 8,021,737 B2
(45) Date of Patent: Sep. 20, 2011

(54) PANELIZED COVER SYSTEM INCLUDING A CORROSION INHIBITOR

(75) Inventors: Nabil A. Elkouh, Enfield, NH (US); Jeffrey J. Breedlove, Grantham, NH (US); Bruce R. Pilvelait, Charlestown, NH (US)

(73) Assignee: Creare Inc., Hanover, NH (US)

( * ) Notice: Subject to any disclaimer, the term of this patent is extended or adjusted under 35 U.S.C. 154(b) by 0 days.

(21) Appl. No.: 12/896,223

(22) Filed: Oct. 1, 2010

(65) Prior Publication Data

US 2011/0027523 A1 Feb. 3, 2011

Related U.S. Application Data

(60) Division of application No. 12/816,954, filed on Jun. 16, 2010, which is a division of application No. 11/669,264, filed on Jan. 31, 2007, now Pat. No. 7,759,265, which is a division of application No. 10/892,664, filed on Jul. 15, 2004, now Pat. No. 7,183,230, which is a continuation of application No. 10/229,096, filed on Aug. 27, 2002, now Pat. No. 6,794,317, which is a continuation-in-part of application No. 09/557,845, filed on Apr. 26, 2000, now Pat. No. 6,444,595.

(60) Provisional application No. 60/315,317, filed on Aug. 28, 2001, provisional application No. 60/315,668, filed on Aug. 29, 2001, provisional application No. 60/386,017, filed on Jun. 5, 2002.

(51) Int. Cl.
*B32B 3/06* (2006.01)
*B32B 3/02* (2006.01)
*B32B 3/14* (2006.01)

(52) U.S. Cl. ............... 428/99; 428/47; 428/48; 428/56; 428/58; 428/100

(58) Field of Classification Search .................. 428/44, 428/47, 48, 52, 54–58, 99, 100
See application file for complete search history.

(56) References Cited

U.S. PATENT DOCUMENTS

| | | | |
|---|---|---|---|
| 3,315,676 | A | 4/1967 | Cooper |
| 3,936,560 | A | 2/1976 | Santurri et al. |
| 4,034,375 | A | 7/1977 | Wallin |
| 4,194,041 | A | 3/1980 | Gore et al. |
| 4,321,297 | A | 3/1982 | Adelman |
| 4,467,005 | A | 8/1984 | Pusch et al. |

(Continued)

FOREIGN PATENT DOCUMENTS

JP S59-191346 12/1984

(Continued)

OTHER PUBLICATIONS

William R. Baschnagel, Phase I Summary Report; Flexible Corrosion Preventative Coverings; http://204.255.139.193/sbirsearch/sbirsearch/sbir/creare4p1.html; Mar. 2, 2000.

(Continued)

*Primary Examiner* — Jenna Johnson
(74) *Attorney, Agent, or Firm* — Downs Rachlin Martin PLLC

(57) ABSTRACT

A protective cover system for inhibiting corrosion of a metallic object. The protective cover system includes a cover for defining a microenvironment adjacent a metallic object and a corrosion inhibitor source for releasing one or more corrosion inhibitors into the microenvironment.

5 Claims, 5 Drawing Sheets

U.S. PATENT DOCUMENTS

| | | | |
|---|---|---|---|
| 4,493,870 A | 1/1985 | Vrouenraets et al. | |
| 4,529,633 A | 7/1985 | Karlsson | |
| 4,659,602 A | 4/1987 | Birch | |
| 4,673,402 A | 6/1987 | Weisman et al. | |
| 4,684,568 A | 8/1987 | Lou | |
| 4,684,785 A | 8/1987 | Cole | |
| 4,699,620 A | 10/1987 | Bernardin | |
| 4,923,453 A | 5/1990 | Bullard, Jr. | |
| 5,077,556 A | 12/1991 | Aisslinger | |
| 5,135,792 A | 8/1992 | Hogan | |
| 5,149,336 A | 9/1992 | Clarke et al. | |
| 5,153,045 A | 10/1992 | Lofgren | |
| 5,374,260 A | 12/1994 | Lemay et al. | |
| 5,378,522 A * | 1/1995 | Lagomarsino | 428/100 |
| 5,418,044 A | 5/1995 | Mahler | |
| 5,466,232 A | 11/1995 | Cadieux et al. | |
| 5,565,139 A | 10/1996 | Walker et al. | |
| 5,599,335 A | 2/1997 | Goldman et al. | |
| 5,599,336 A | 2/1997 | Plischke | |
| 5,701,617 A | 12/1997 | Colby | |
| 5,736,231 A | 4/1998 | Todt | |
| 5,744,570 A | 4/1998 | Gebben | |
| 5,769,106 A | 6/1998 | Achuff | |
| 5,770,086 A | 6/1998 | Indriksons et al. | |
| 5,830,201 A | 11/1998 | George et al. | |
| 5,845,958 A | 12/1998 | Rudys et al. | |
| 5,849,405 A | 12/1998 | Wang et al. | |
| 5,885,912 A | 3/1999 | Bumbarger | |
| 5,907,908 A | 6/1999 | Cunanan et al. | |
| 5,938,976 A | 8/1999 | Heimann et al. | |
| 5,941,862 A | 8/1999 | Haynes et al. | |
| 5,970,541 A | 10/1999 | Chiang | |
| 5,989,697 A | 11/1999 | Gebben | |
| 6,011,195 A | 1/2000 | Muhs et al. | |
| 6,011,196 A | 1/2000 | Wang et al. | |
| 6,028,160 A | 2/2000 | Chandler et al. | |
| 6,051,317 A | 4/2000 | Brueggemann et al. | |
| 6,100,208 A | 8/2000 | Brown et al. | |
| 6,156,929 A | 12/2000 | Chandler et al. | |
| 6,242,371 B1 | 6/2001 | Quinones | |
| 6,317,889 B1 | 11/2001 | Reilly et al. | |
| H2011 H | 1/2002 | Freiburger et al. | |
| 2003/0049986 A1 | 3/2003 | Qureshi et al. | |

FOREIGN PATENT DOCUMENTS

| | | |
|---|---|---|
| JP | S59-221273 | 12/1984 |
| JP | S64-13800 | 1/1989 |
| JP | 3008508 | 12/1994 |
| JP | 3058076 | 3/1999 |
| JP | 2000-062834 | 2/2000 |
| JP | 2001-31133 | 2/2001 |
| JP | 2001-247156 | 9/2001 |

OTHER PUBLICATIONS

Dr. Nabil A. Elkouh, Flexible Corrosion Preventative Coverings; Navy SBIR Aware; http://204.255.139.193/sbirsearch/sbirsearch/sbir/n99a02770.hmtl: Mar. 2, 2000.

First Office Action dated Nov. 4, 2008 in connection with related Japanese patent application No. 2004-511044.

Supplementary European Search Report dated Jun. 24, 2009 in connection with related European patent application No. 03734365.4.

First Office Action dated Sep. 22, 2010 in connection with related U.S. Appl. No. 12/816,954, filed Jun. 16, 2010, entitled "Protective Cover System Including a Corrosion Inhibitor and Method of Inhibiting Corrosion of a Metallic Object," Nabil A. Elkouh.

Response to First Office Action dated Sep. 22, 2010 in connection with related U.S. Appl. No. 12/816,954, filed Jun. 16, 2010, entitled "Protective Cover System Including a Corrosion Inhibitor and Method of Inhibiting Corrosion of a Metallic Object," Nabil A. Elkouh.

Final Office Action dated Mar. 14, 2011 in connection with related U.S. Appl. No. 12/816,954, filed Jun. 16, 2010, entitled "Protective Cover System Including a Corrosion Inhibitor and Method of Inhibiting Corrosion of a Metallic Object," Nabil A. Elkouh.

* cited by examiner

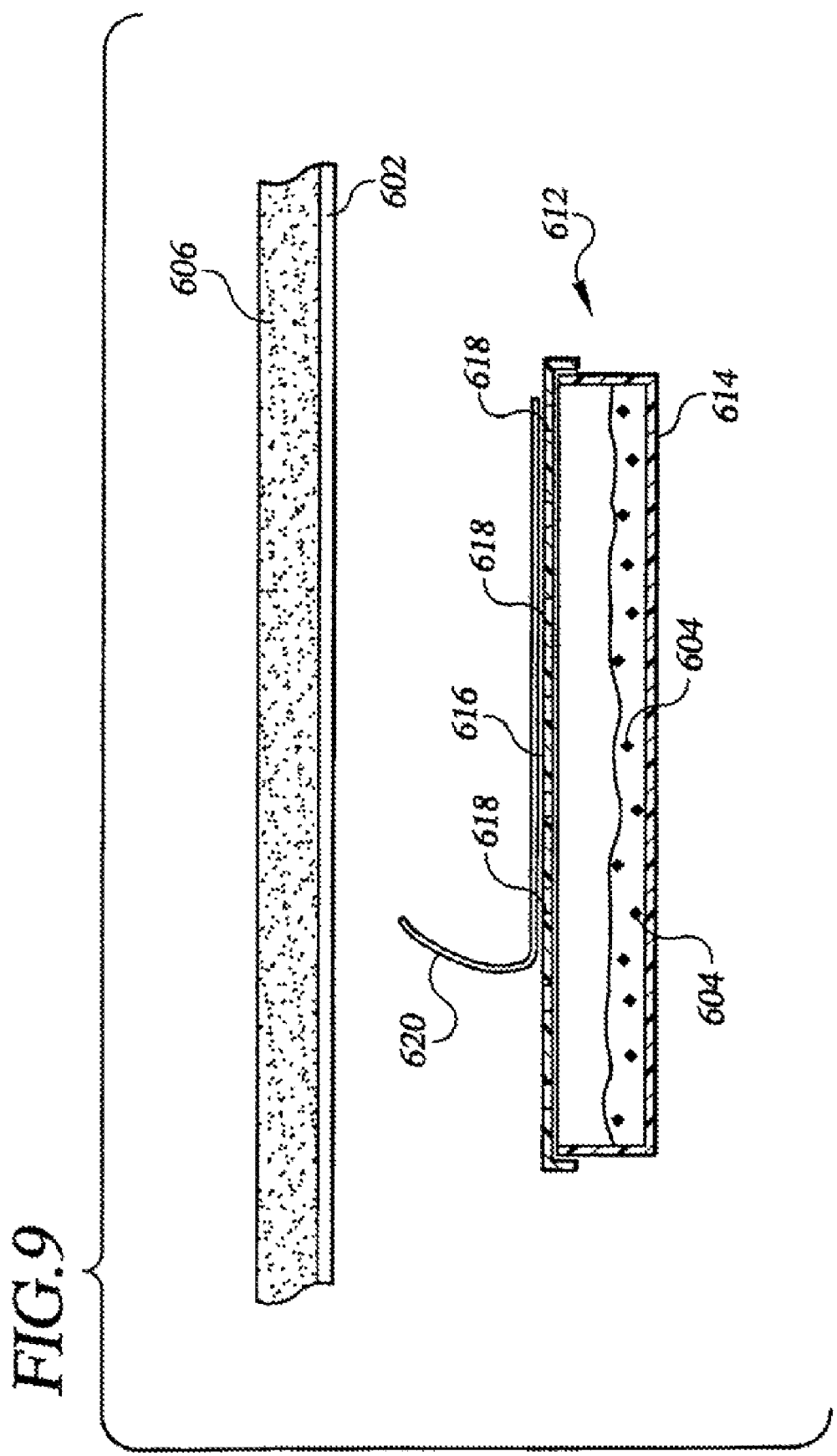

PANELIZED COVER SYSTEM INCLUDING A CORROSION INHIBITOR

This application is a divisional of U.S. application Ser. No. 12/816,954 filed Jun. 16, 2010, which is a divisional of U.S. application Ser. No. 11/669,264 filed Jan. 31, 2007, now U.S. Pat. No. 7,759,265, which is a divisional of U.S. application Ser. No. 10/892,664 filed Jul. 15, 2004, now U.S. Pat. No. 7,183,230, which is a continuation of U.S. application Ser. No. 10/229,096 filed Aug. 27, 2002, now U.S. Pat. No. 6,794,317, which is a continuation-in-part of U.S. application Ser. No. 09/557,845 filed Apr. 26, 2000, now U.S. Pat. No. 6,444,595. In addition, this application claims the benefit of priority of U.S. Provisional patent application Ser. No. 60/315,317 filed Aug. 28, 2001, U.S. Provisional patent application Ser. No. 60/315,668 filed Aug. 29, 2001, and U.S. Provisional patent application No. 60/386,017 filed Jun. 5, 2002. Each of these applications is incorporated herein in its entirety.

FIELD OF THE INVENTION

The present invention generally relates to the field of covers for protecting materials from environmental elements. More particularly, the present invention is directed to a protective cover system that includes a corrosion inhibitor and a method of inhibiting corrosion of a metallic object.

BACKGROUND OF THE INVENTION

Attention to corrosion and corrosion mitigation have become increasingly important for economic and safety reasons. Based on estimates made in the mid 1990's, overall costs attributable to corrosion account for over $100 billion a year in the United States alone. These costs typically account for only the direct costs of corrosion and do not include the associated indirect costs, such as safety, plant downtime, loss of product, contamination and over-design.

Corrosion may be defined as the destructive effect of an environment on a metal or metal alloy. Nearly every metallic corrosion process involves the transfer of electronic charge in aqueous solution, and most corrosion reactions take place in the presence of water in either liquid or condensed vapor phases and also in high humidity. Corrosion is particularly a problem in marine environments experienced in places such as shipboard, aboard off-shore drilling rigs, and in coastal regions, among others, where seawater enhances corrosion reactions due to increased ion transport, pH effects, and elevated dissolved oxygen levels that in turn enhance levels of hydrogen ions. Corrosion reactions are further accelerated in marine environments by contaminants, such as chloride ions, present in seawater. Corrosion damage to equipment stored and used in marine environments is a tremendous problem, impacting maintenance costs, availability, repair, and reliability.

Equipment stored, e.g., onboard a ship or in coastal regions, is often stored in protective storage systems that have proved to be less than optimally effective. At best, such equipment is covered with waterproof tarpaulins, although often, especially for shipboard equipment, it is not covered properly and is directly exposed to a marine environment, which leads to rapid corrosion. Even when equipment is covered by waterproof tarpaulins, seawater still penetrates through and/or around the tarpaulins into the protected spaces where it collects and corrodes the underlying equipment. Also, conventional storage systems can be cumbersome to use and maintain, and are therefore often avoided. As a result, corrosion continues to be a significant and costly problem, requiring many hours of rust removal, painting, and repair that often lead to premature equipment replacement.

FIG. 1 shows a conventional waterproof cover 20 used to protect an object, such as metallic object 22 resting on a surface 24, from moisture, such as rain, sea spray, dew and the like. Cover 20 has an outer surface 26, an inner surface 28, and an area 30 defined by a peripheral edge 32. Cover 20 is shown covering object 22 in a typical manner, wherein a microenvironment is generally defined by the space enclosed by the cover. The microenvironment comprises a number of interior regions, such as regions 34, located between cover 20 and object 22.

Generally, conventional covers, such as cover 20, comprise at least one liquid-impermeable layer made of, e.g., a tightly-woven polymer fabric or a non-woven structure, such as a continuous film or other membrane. More complex conventional covers may include one or more additional layers that provide them with additional features, such as highly durable outer surfaces to withstand harsh environments and non-abrasive inner-surfaces to minimize mechanical damage to the object covered. Other conventional covers are made of vapor-permeable, porous materials, such as expanded polytetrafluoroethylene or the like.

The air in interior regions 34 generally never has a moisture content less than the moisture content of the ambient environment. If the moisture content of the ambient environment rises, the moisture content of regions 34 also rises due to the inflow of moisture (illustrated by arrow 36) through gaps between cover 20 and surface 24 at peripheral edges 32 of the cover. Eventually, the moisture content of the ambient environment 38 and regions 34 equalize. Once the additional moisture is in the microenvironment, it can become trapped, as illustrated by arrows 40. Moisture levels can quickly become elevated, and the air saturated. In such a case, condensation could occur on the object 22. Because the moisture content of interior regions 34 never falls below that of ambient environment 38, conventional covers are not very effective in high moisture environments, such as marine and high-humidity environments. Moreover, once moisture enters the microenvironment, it can take a long time to dissipate, if at all.

SUMMARY OF THE INVENTION

In one implementation, the present disclosure is directed to a panelized cover system for protecting an object from moisture. The panelized cover system includes: a plurality of panels each comprising: a first layer having a first face and a second face, the first layer comprising a superabsorbent material adapted to absorb and store the moisture; and a second layer located adjacent the first face of the first layer, the second layer being liquid-impermeable; wherein each of the plurality of panels is fastened to at least one adjacent one of the plurality of panels.

In another implementation, the present disclosure is directed to a panelized cover system for protecting an object by forming a microenvironment adjacent the object when the panelized cover system is applied to the object. The panelized cover system includes: a plurality of panels each comprising: a first layer having a first face and a second face and comprising a liquid-impermeable water-vapor-permeable material; and a second layer continuously attached to the first layer at the first face of the first layer and being made of a porous material; and a corrosion inhibitor source for providing at least one corrosion inhibitor to the microenvironment when the panelized cover system is applied to the object; wherein each of the plurality of panels is fastened to at least one adjacent one of the plurality of panels.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein:

FIG. 9 is an enlarged cross-sectional view of a portion of another alternative embodiment of the protective cover system of the present invention having a corrosion inhibitor contained in a container separate from the cover.

DETAILED DESCRIPTION OF THE DRAWINGS

Figure 1:
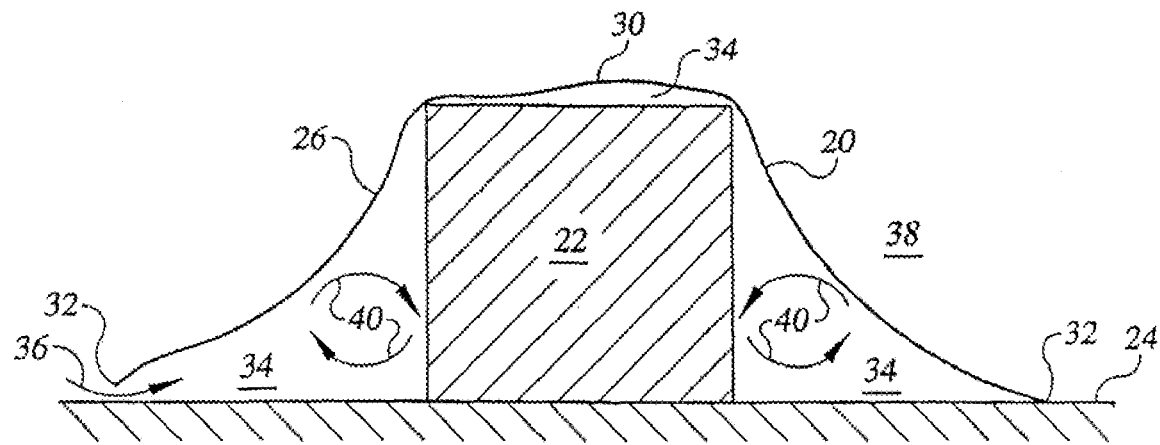
FIG. 1 is a cross-sectional view of a prior art cover shown covering an object.
Figure 2:
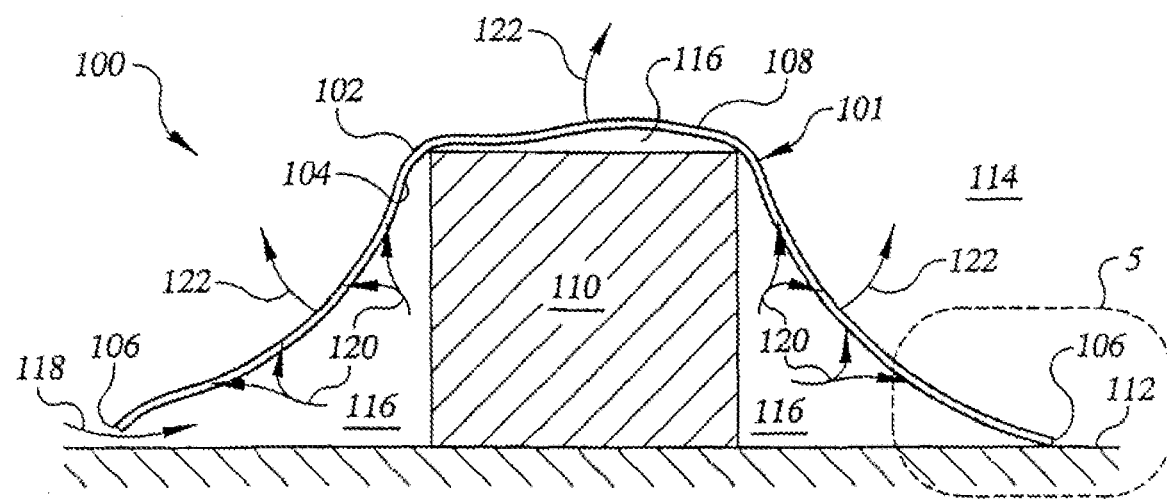
FIG. 2 is a cross-sectional view of a protective cover system of the present invention showing the cover thereof covering an object.

Referring now to the drawings, wherein like numerals indicate like elements, FIG. 2 illustrates a protective, corrosion-inhibiting cover system, which is generally denoted by the numeral 100. Cover system 100 may include a cover 101 that may be made of flexible materials and includes an outer surface 102, an inner surface 104, and a peripheral edge 106 that defines an area 108, which may be shaped as desired to suit a particular application. Alternatively, cover 101 may include rigid materials that may be formed into a shape conforming to the shape of the object to be covered or to another shape suitable for that object. When covering an object, such as a metallic object 110 resting on a surface 112, outer surface 102 is exposed to an ambient environment 114 and inner surface 104 defines a microenvironment comprising one or more interior regions, such as the interior regions 116, located between inner surface 104 and object 110 and/or surface 112.

Although object 110 is generally protected from elements present in ambient environment 114 by cover 101, often moisture from the ambient environment tends to infiltrate (as illustrated by arrow 118) interior regions 116 through gaps between peripheral edge 106 of the cover and surface 112. A feature of the present invention allows cover 101 to absorb and store such infiltrating moisture (as illustrated by arrows 120), and other moisture trapped within interior regions 116, so as to maintain the moisture content of the microenvironment at a low level, often below the moisture content of ambient environment 114. Another feature of the present invention allows cover 101 to absorb and store by wicking action any water present on the surface of object 110 that comes into contact with inner surface 104 of the cover. The result is a low-moisture microenvironment that inhibits metallic object 110 from corroding.

Yet another feature of the present invention permits cover 101 to regenerate its moisture-absorbing and storing features by diffusing stored moisture to outer surface 102 of the cover, where it can evaporate (as illustrated by arrows 122) into ambient environment 114 when conditions there are suitable for evaporation. A further feature of the present invention is the ability to disperse one or more corrosions inhibitors into regions 116 of the microenvironment formed beneath cover 101 so that the corrosion inhibitors are deposited on the surface of metallic object 110, e.g., as a film 123.

As discussed in more detail below, each of these and other features may be incorporated into protective cover system 100 of the present invention either singly or in various combinations with one another. For example, one embodiment of cover 101 may be provided with the moisture absorbing feature, but not the corrosion inhibitor feature. Likewise, another embodiment may be provided with the corrosion inhibitor feature, but not the moisture-absorbing feature. Of course, another embodiment may include both the moisture absorbing and corrosion inhibitor feature. Each of these embodiments may optionally be augmented or supplemented as desired and/or appropriate with various other features, such as the surface wicking, edge wicking, radar influencing, evaporation augmenting, and panelization features, among others, described herein.

A beneficial attribute of protective cover system 100 of the present invention is that it can be made to any size and shape necessary to protect an object having virtually any size and surface profile. Some diverse examples of such objects are containers for container ships, deck-mounted guns on naval ships, construction equipment, stored construction materials, air conditioning units and barbeque grills, to name just a few. Pouches made from cover 101 could be fashioned to store munitions, tools, handguns and telephones and other electronic devices to name just a few. One skilled in the art will recognize that there is a vast range of applications for protective cover system 100 of the present invention.

Figure 3:
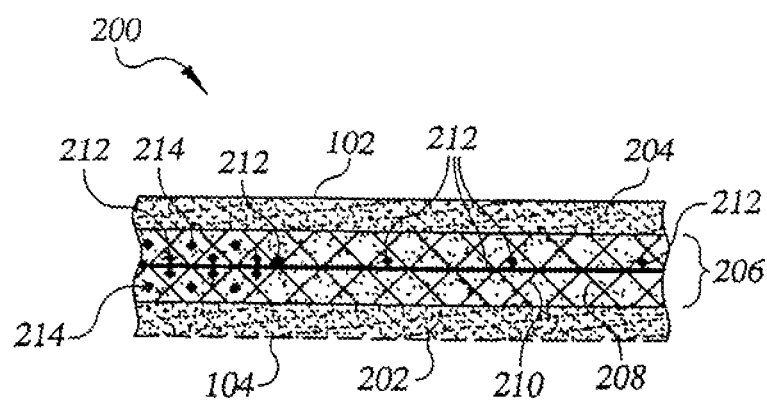
FIG. 3 is a cross-sectional view of a portion of one embodiment of the protective cover system of the present invention.

FIG. 3 shows one embodiment of protective cover system 100 of the present invention, which may include a cover identified by the numeral 200. Cover 200 may comprise a liquid-permeable layer 202, a liquid-impermeable layer 204, and a moisture-absorbing layer 206 sandwiched between the liquid-permeable and liquid-impermeable layers. With reference to FIGS. 2 and 3, liquid-permeable layer 202 generally defines inner surface 104 of cover 200 and may, among other things, retain the constituent material(s) (described below) of moisture-absorbing layer 206 within the cover. Liquid-permeable layer 202 may be vapor permeable to allow moisture vapor within interior regions 116 to reach moisture-absorbing layer 206 and liquid-permeable to allow any liquid water contacting inner surface 204 of cover 200 to be wicked into the moisture-absorbing layer. In a typical embodiment, liquid-permeable layer 202 has a water transmission rate that is greater than 10 $g/m^2$–hr, although the present invention encompasses the use of liquid-permeable layers having somewhat lower water transmission rates. Liquid-permeable layer 202 may be made of any suitable material, such as wovens, knits, perforated films, open-cell foams, meltblowns, or spunbonds, among others, or combination of materials, e.g., a woven material coated with a porous open-cell foam, that is liquid and vapor permeable. Those skilled in the art will appreciate the breadth and variety of materials that may be used for liquid-permeable layer 202 such that an exhaustive recitation of such materials is unnecessary for those skilled in the art to understand the broad scope of the present invention.

For some applications, it is generally preferable, but not necessary, that liquid-permeable layer 202 be made of a material that can withstand repeated use and continual contact with a wide variety of surfaces. It may also be preferable for some applications that liquid-permeable layer 202 be relatively smooth and/or soft so that damage to an object contacted by liquid-permeable layer 202 may be avoided. An example of a material suitable for liquid-permeable layer 202 is the K-Too™ un-backed knitted nylon available from HUB Fabric Leather Company, Inc., Everett, Mass. Other suitable materials include polyester mesh Style No. 9864, available from Fablock Mills, Murry Hill, N.J., and nylon, polypropylene, and other knits that are available from Fablock Mills Inc., Murry Hill, N.J., Jason Mills Inc., Westwood, N.J., and Apex Mills, Inwood, N.Y., among others. These few examples of knits are merely several particular materials the inventors have found suitable. Those skilled in the art will readily appreciate that suitable non-knit materials are widely available and readily substitutable for the knit materials mentioned above. Accordingly, those skilled in the art will also readily appreciate that an exhaustive presentation of exemplary materials is not necessary to understand the broad scope of the present invention.

Moisture-absorbing layer 206 may include any suitable absorbent material or combination of materials. For example, moisture-absorbing layer may contain a matrix 210 and a superabsorbent material 208, e.g., hydrogel, among others, dispersed within the matrix. Those skilled in the art will understand that many superabsorbent and matrix materials are known and may be used in conjunction with the present invention. For example, U.S. Pat. No. 6,051,317 to Brueggemann et al., which is incorporated herein by reference, describes a number of superabsorbent and matrix materials that may be used within moisture-absorbing layer 206. Superabsorbent material 208 may be provided as particulate, fiber, or other form, which allows it to be dispersed throughout matrix 210. Alternatively, superabsorbent material 208 may be located in a generally discrete layer within matrix 210.

Examples of acceptable materials for matrix 210 include wool, fiberglass, polymer fleece, fluff wood pulp, and the like. It is desirable that fiber matrix 210 be hydrophilic and have a high capillarity, e.g., greater than 10 g/m$^2$–hr (although lower capillarity rates are encompassed in the present invention), so that moisture coming into contact with moisture-absorbing layer 206 through liquid-permeable layer 202 may be wicked deep into moisture-absorbing layer 206 to take advantage of the superabsorbent material located there, if any. Although matrix 210 is shown, it may be eliminated in an alternative embodiment having superabsorbent material 208 in a form that need not be supported by, and/or located within, a matrix.

As mentioned, hydrogel is one example of a class of superabsorbent materials suitable for superabsorbent material 208. Some forms of hydrogel are capable of absorbing up to 400 times their weight in water. With such a large absorption capability, particles of hydrogel can swell to many times their original size. If the hydrogel particles are not distributed properly throughout fiber matrix 210, moisture-absorbing layer 206 may experience "hydroblocking," wherein the hydrogel particles closest to the moisture source swell so much that they block moisture from being wicked farther into the fiber matrix. Although some of the absorbed moisture eventually reaches the hydrogel located deep within matrix 210 by diffusion, diffusion is a relatively slow process that may degrade the usefulness of a cover experiencing hydroblocking, particularly in high-moisture conditions. Therefore, it is recommended care be taken to distribute a hydrogel-type superabsorbent material 208 within matrix 210 in a manner that minimizes, or eliminates, hydroblocking so that when the superabsorbent material and matrix adjacent liquid-permeable layer 202 is saturated, the matrix is still able to wick water deeper into moisture-absorbing layer 206.

Liquid-impermeable layer 204 may define outer surface 102 of cover 200 and may be selected to generally prevent liquid in ambient environment 114, such as rain, sea spray, dew, and the like, from reaching interior regions 116 beneath the cover. It is preferable, but not necessary, that liquid-impermeable layer 204 be made of one or more vapor-permeable materials to allow moisture stored in moisture-absorbing layer 206 and/or present in interior regions 116 of the microenvironment to escape into ambient environment 114 by diffusion and evaporation as described above. In a typical embodiment, liquid-impermeable layer 204 has a vapor transmission rate of greater than 1 g/m$^2$–hr, although liquid-impermeable layers with lower vapor transmission rates may also be employed in certain circumstances.

The liquid transmission rate through the liquid-impermeable layer 204 should be less than the employed vapor transmission rate for this layer. For the typical lower bound of 1 g/m$^2$–hr. of vapor transmission through liquid-impermeable layer 204, a liquid transmission rate through this layer could be any value less than 1 g/m$^2$–hr. If the vapor transmission rate were greater, the corresponding acceptable level of liquid transmission would be greater, as long as it remained less than the vapor transmission rate. By allowing stored moisture to escape, cover 200 is capable of regenerating itself, i.e., losing previously absorbed and stored moisture to ambient environment 114, e.g., by evaporation, during periods of low moisture in the ambient environment so that it may absorb and store more moisture during a subsequent period when interior regions 116 again become moisture laden. Beneficially, liquid-impermeable layer 204 may also be designed to absorb solar energy to provide heat to cover 200 that accelerates regeneration of moisture-absorbing layer 206.

Liquid-impermeable layer 204 may comprise any suitable woven or non-woven material or a combination of the two. As used herein and the claims appended hereto, the term non-woven shall include any material that is not woven, e.g., a film, knit, foam, felt, melt-blown, spunbond, air-laid, cast material, extruded material, and molded material, among others. For example, in one embodiment of cover 200 wherein liquid-impermeable layer 204 is vapor permeable, the liquid-impermeable layer may include one or more layers of various porous, vapor-permeable materials, such as a laminate of a 200 denier nylon inner layer and a breathable urethane outer layer. Such a nylon/urethane laminate is available from LAMCOTEC Incorporated, Monson, MA. Other suitable porous vapor-permeable materials include expanded polytetrafluoroethylene, GORE-TEX® fabric (W. L. Gore & Associates, Inc., Newark, Del.), SUNBRELLA® fabric (Glen Raven Mills Inc., Glen Raven, N.C.), Hub Semi-Permeable fabric (Hub Fabric Leather Company, Everett, Mass.) or the like, may alternatively be used. Like liquid-permeable layer 202, those skilled in the art will appreciate that the foregoing examples of suitable porous, vapor-permeable materials for liquid impermeable layer 204 are merely representative of the many materials that may be used for this layer. Accordingly, an exhaustive list of such suitable materials herein is not necessary for those skilled in the art to understand the broad scope of the present invention.

In another embodiment of cover 200, liquid-impermeable layer 204 may include a non-porous, water-vapor-permeable film that allows moisture contained within moisture-absorbing layer 206 to be transported into ambient environment 114 when conditions are suitable for such transport to occur. Examples of such non-porous, water vapor permeable films include the copolyether ester films described in U.S. Pat. No. 4,493,870 to Vrouenraets et al., e.g., SYMPATEX® film available from SympaTex Technologies GmbH, Wuppertal, Germany, the copolyether amide films described in U.S. Pat. Nos. 5,989,697 and 5,744,570, both to Gebben, and films comprising a tetrafluoroethylene matrix interspersed with sulfonic acid groups, e.g., NAFION® film available from E.I. DuPont de Nemours Company, Wilmington, Del., among others. U.S. Pat. Nos. 4, 493,870, 5,989,697, and 5,744,570 are incorporated herein by reference.

Generally, these films are non-porous so that liquid water and other substances cannot pass through them. It is believed that each of these films works on a molecular level to transport water molecules from a region on one side of the film having a relatively higher moisture content to a region on the other side of the film having a relatively lower moisture content by an adsorption/desorption process within special hydrophilic polymer regions of the film. Typically, but not necessarily, each of these non-porous, water vapor permeable films would be continuously bonded, or otherwise attached, to a backing layer that provides support for the film. This is so because these films are generally very thin, e.g., on the order of tens of microns thick and, standing alone, would typically not be robust enough for some of the contemplated applications of cover 200 of the present invention. An example of such a laminated composite is a 500 denier woven CORDURA® nylon fabric, which has been acid dyed and treated with a durable water repellent, laminated to a 15 micron thick SYMPATEX® film (CORDURA is a registered trademark of E.I. DuPont de Nemours and Company, Wilmington, Del.). This laminate is available from Brookwood Companies, Inc., New York, N.Y.

In an alternative embodiment, cover 200 may further include a heating element 212 (FIG. 3) that would allow moisture-absorbing layer 206 to regenerate more quickly or regenerate when the conditions in ambient environment 114 would otherwise not permit evaporation of the stored moisture. Such a heating element may comprise an electrical resistance wire grid located within one of the layers or between adjacent layers. Alternatively, the heating element may comprise arrays of thin, flexible heating elements consisting of etched-foil resistive elements laminated between layers of flexible insulation like KAPTON®, NOMEX®, silicone rubber, or mica, or arrays of thin film ceramic elements available from Minco Products Incorporation, Minneapolis, Minn. and Watlow Gordon, Richmond, Ill. among others (KAPTON® and NOMEX® are registered trademarks of E.I. DuPont de Nemours and Company, Wilmington, Del.). Those skilled in the art will appreciate the variety of heating elements 212 that may be incorporated into cover 200 if this feature is desired.

In another alternative embodiment, cover 200 may further include a corrosion inhibitor 214 (FIG. 3) incorporated into one or more of the layers of the cover discussed above, into an additional layer, and/or into one of more corrosion inhibitor sources generally separate from the cover. If one or more separate corrosion inhibitor sources are provided, each may be located within the microenvironment defined by the cover, e.g., in an interior region 116, or otherwise placed into communication with the microenvironment so that corrosion inhibitor (214) may enter the microenvironment and provide protection to metallic object 110 (FIG. 2). Examples of suitable materials for use as corrosion inhibitor 214 include vapor, or vapor-phase, corrosion inhibitors (VCIs) (also known as "volatile corrosion inhibitors"), contact corrosion inhibitors, and migrating corrosion inhibitors, among others. Generally, VCIs are volatile compounds that emit ions that condense on metallic surfaces to form a mono-molecular layer that interacts with corrosion agents to protect the surface. Contact corrosion inhibitors generally require surface-to-surface contact with the object to be protected in order to provide protection (although they may also migrate from one region to another to some extent). Migrating corrosion inhibitors migrate through a solid diffusion process. Each of these types of corrosion inhibiting materials is generally continuously self-replenishing and environmentally benign. These corrosion inhibiting materials may be used alone or in combination with one another as desired to suit a particular application.

Examples of corrosion inhibiting materials include, among others, cyclohexylammonium benzoate, ethylamino benzoate, calcium sulfonate, calcium carbonate, sodium benzoate, amine salts, ammonium benzoate, silica, sodium sulfonate, triazole derivatives, such as toltriazol and benzotriazol, alkali dibasic acid salts, alkali nitrites, such as sodium nitrite, tall oil imidazolines, alkali metal molybdates, dyclohexylammonium nitrate, cyclohexylamine carbonate, and hexmethyleneimine nitrobenzoate. These VCIs materials may be obtained from a number of sources, including Cortec Corporation, St. Paul, Minn., Daubert Coated Products Incorporated, Westchester, Ill., Poly Lam Products, Buffalo, N.Y., Mil-Spec Packaging of Georgia Incorporated, Macon, Ga., and James Dawson Enterprises Limited, Grand Rapids, Mich., among others. U.S. Pat. No. 6,028,160 to Chandler et al., which is incorporated herein by reference, lists the foregoing and other compounds that may be suitable for use as corrosion inhibitor 214.

As mentioned, corrosion inhibitor 214 may be incorporated into one or more of the above-described layers of cover, provided in one or more layers separate from the layers of the cover, or may be provided in a separate corrosion inhibitor source, among other alternative. When provide as a separate layer, corrosion inhibitor 214 may be incorporated into a coating applied to one or more of the layers, e.g., one or more of layers 202, 204, 206, or incorporated into a separate layer (not shown), e.g., a separate film, woven, knit, melt-blown, spunbond, foam, or other layer, comprising a suitable vehicle material, such as polyethylene, polypropylene, or nylon, among others. Those skilled in the art will understand how the various corrosion inhibiting materials may be combined with various resins and other bases for providing a vehicle for the corrosion inhibiting materials. For example, U.S. Pat. No. 6,028,160 to Chandler et al., mentioned above, discusses vehicle resin/VCI blends in the context of biodegradable polymeric films. Similar formulations may be used for non-biodegradable films. In addition, a vehicle resin/VCI blend may be used form a structure other than film, such as the woven, knit, meltblowmelt-blown, spunbond, and foam structures noted above.

The addition of a corrosion inhibitor 214 to cover 200 can enhance the corrosion inhibiting ability of the cover by allowing the cover to continue to provide protection when the moisture-absorbing layer is overwhelmed. When moisture-absorbing layer 206 is present, which it need not be (see FIGS. 8A-C and accompanying discussion), corrosion inhibitor 214 may benefit from the presence of the moisture-absorbing layer because this layer removes the burden from the corrosion inhibitor by not requiring it to offer protection at all times. It is noted that corrosion inhibitor 214 may be provided to any embodiment of the cover of the present invention, such as those shown in FIGS. 4-8, and in any form, such as a coating, a separate layer, incorporation into one or more of the liquid-permeable, moisture-absorbing, and liquid-impermeable layers, and a separate source, each of which is described herein.

Layers 202, 204, 206 may be secured to one another in any suitable manner. For example, these layers may be bonded to one another throughout area 108 of cover 200 in a manner that does not interfere with its liquid and vapor transport features, yet retains the layers in physical proximity to one another. Bonding processes known in the art may be used to bond or join the layers of cover 200. For example, bonding processes such as thermal bonding or multi-component adhesive bonding may be used. Alternatively, the various layers of cover 200 may be secured to one another by other means, such as stitching, or other mechanical fasteners, e.g., rivets, among others.

Depending on the size and materials of the cover, it may only be necessary to provide stitching adjacent peripheral edge 106. In other uses, it may be desirable to provide quilt-stitching throughout the area. Similarly, bonding may be continuous, only at peripheral edges, or in a quilted fashion, among others. Of course, various combinations of fastening means may be used for securing different layers to one another and/or to secure the layers in different regions of cover 200. For example, liquid-impermeable layer 206 may be secured to moisture-absorbing layer 206, e.g., by continuous bonding, whereas liquid-permeable layer 202 may be secured to the bonded combination of the liquid-impermeable and moisture-absorbing layers, e.g., by quilt stitching in area 108 and by continuous stitching adjacent peripheral edge 106. Those skilled in the art will appreciate the many variations of securing the various layers of cover 200 to one another such that an exhaustive recitation of all possible securing means need not be described in detail herein.

In a further alternative embodiment, liquid-impermeable layer 204 may be removably secured to the other two layers 202 and 206 to allow it to be removed to speed regeneration of the moisture-absorbing layer in times of favorable conditions in ambient environment. Refastenable fasteners, such as hook-and-loop fasteners, snaps, zippers and the like, may be provided to facilitate this feature. Additionally, moisture-absorbing layer 206 may be bonded or formed via an airlaid process known in the art as a process of producing a non-woven web of fibers in sheet form where the fibers are transported and distributed via air flows where the entire sheet is then set with a mixture of binders and resins.

Figure 4:
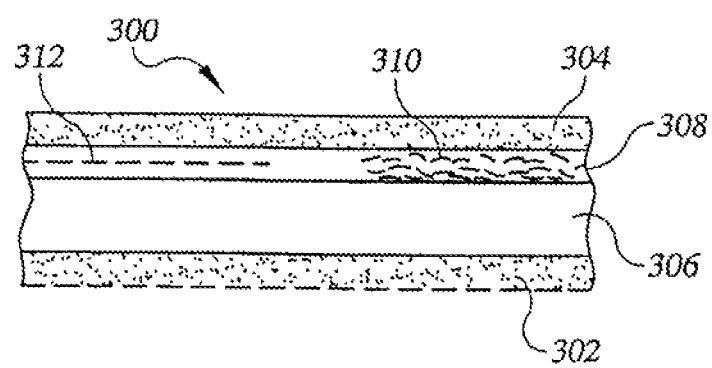
FIG. 4 is a cross-sectional view of a portion of an alternative embodiment of the protective cover system of the present invention.

FIG. 4 shows another specific embodiment of cover 101 of the present invention, which is identified by the numeral 300. Cover 300 may comprise the three layers of cover 200 shown in FIG. 3, i.e., a liquid-permeable layer 302, a liquid-impermeable layer 304 and a moisture-absorbing layer 306 (these layers being identical, respectively, to layers 202, 204 and 206). In addition to these layers, cover 300 may further includes a radar-influencing layer 308. Radar-influencing layer 308 may comprise a radar-absorbing material 310, a radar-reflecting material 312 or a combination of both, depending upon the desired radar profile of cover 300. With reference to FIG. 2, it may be preferable to have entire area 108 of cover 300 be radar-attenuating. For example, in a military application it may be necessary to reduce the radar profile of a large object to conceal its identity. On the other hand, it may be preferable to have entire area 108 be radar-enhancing. For example, in a civilian application it may be advantageous to increase the radar profile of a small water craft to accentuate its presence. In another instance, it may be desirable to provide area 108 with alternating discrete radar-attenuating, radar-enhancing, and/or radar neutral regions to give cover 300 a custom radar profile.

Although radar-influencing layer 308 is shown located between liquid-impermeable layer 304 and moisture-absorbing layer 306, it may be located elsewhere. For example, the radar-influencing layer may be located between moisture-absorbing layer 306 and liquid-permeable layer 304, adjacent outer surface 102 of cover 200, or the like. In addition, radar-absorbing material 310 and radar-reflecting material 312 may be incorporated into one or more of liquid-permeable layer 304, moisture-absorbing layer 306, and liquid-permeable layer 302. Generally, care should be taken, however, to select radar-absorbing and reflecting materials 310, 312 that do not interfere with the vapor and liquid transport features of cover 300.

Radar-absorbing material 310, may comprise polypyrrole-coated polyester fibers, or the like, that may be made into a thread that is then woven into a discrete fabric layer or one or more of layers 302, 304, 306 of cover 300. Such textiles are available from Milliken & Co., Spartanburg, S.C. under the trademark CONTEX®. Alternatively, radar-absorbing material 310 may comprise discrete particles and/or fibers of carbon, graphite, or the like dispersed within a fiber matrix or a coating that is applied to one of layers 302, 304, 306, or is applied to a separate layer that is then incorporated into cover 300. Other examples of radar-absorbing materials are REX radar-absorbing mats (Milliken & Co., Spartanburg, S.C.) and RFWP Weatherproof Foam (R&F Products, Inc., San Marcos, Calif.). Similar techniques may be used for radar-reflecting material 312, except that a metal, such as silver, copper, or compounds of such metals, or the like, which may be provided as a thread, discrete particles, or other form incorporated into cover 300 in any suitable manner.

Figure 5:
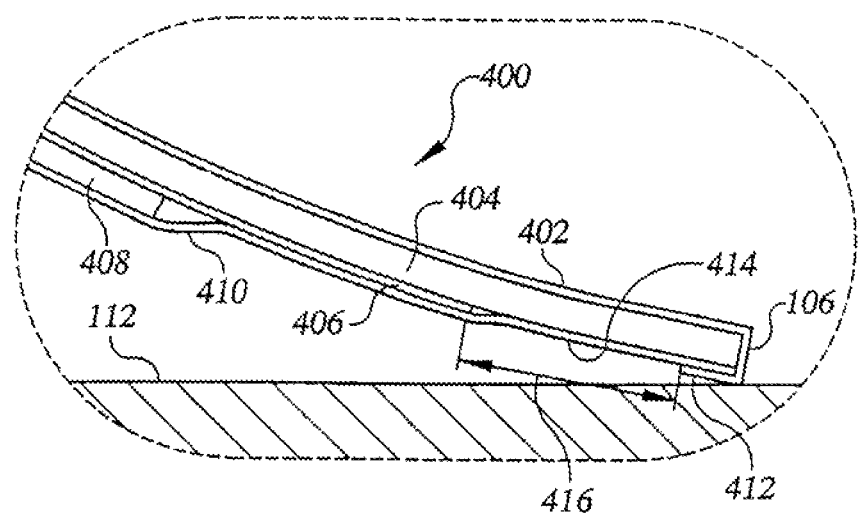
FIG. 5 is an enlarged view of one edge of the cover shown in FIG. 2, for a particular embodiment of the cover of the present invention.

Referring now to FIGS. 2 and 5, there is shown yet another embodiment of cover 101 of the present invention, which is identified by the numeral 400. In FIG. 5, cover 400, which may have the five-layer construction shown, is illustrated with its peripheral edge 106 contacting surface 112, which may be, e.g., a ship's deck, tarmac, or other similar surface. In such applications, it can be common for a large amount of liquid water to be absorbed by cover 400 at regions adjacent peripheral edge 106. This is so because much of the water from ambient environment 114, such as rain, sea spray, dew and the like, repelled by cover 400 from area 108 travels down the sloping portions of the cover, ending up adjacent peripheral edge 106. To prevent saturation of cover 400 in regions adjacent peripheral edge 106, additional layers may be added to the three layer structure of FIG. 3 to provide a separate zone for absorbing and storing moisture that may accumulate on surface 112.

Accordingly, cover 400 may include an outer liquid-impermeable layer 402, a first moisture-absorbing layer 404, an intermediate liquid-impermeable layer 406, a second moisture absorbing layer 408, and a liquid-permeable layer 410, which may confront one another in the recited order as shown. The primary purpose of outer liquid-impermeable layer 402 is to prevent liquid water, such as rain, sea spray, dew and the like, from penetrating into the microenvironment, e.g., interior regions 116, beneath cover 400. Outer liquid-impermeable layer 402 may include a return 412 to provide a seamless, robust structure at peripheral edge 106. The primary function of first moisture absorbing layer 404 is to absorb and store moisture that collects on surface 112, whereas the primary function of second moisture absorbing layer 408 is to absorb and store moisture trapped in the microenvironment beneath cover 400.

Intermediate liquid-impermeable layer 406 prevents liquid moisture stored in each of the moisture-absorbing layers from migrating to the other of such layers. At regions adjacent peripheral edge 106, this separation prevents second moisture-absorbing layer 408 from becoming overburdened by moisture from surface 112. Preferably, both liquid-impermeable layers are vapor permeable to allow cover 400 to regenerate passively by losing stored moisture to ambient environment 114 when conditions there permit.

The peripheral edge of the intermediate liquid-impermeable layer 406 is laterally spaced from peripheral edge 106 of cover 400 around the entire periphery of the cover to define an opening 414. When cover 400 is draped over an object, such as metallic block 110, opening 414 may contact, or be slightly spaced from, surface 112, allowing any moisture present on that surface to be wicked into first moisture-absorbing layer 404. Depending on design parameters, such as materials selected, volume of moisture to be absorbed, and the like, the width 416 of opening 414 may be varied accordingly.

Figure 6:
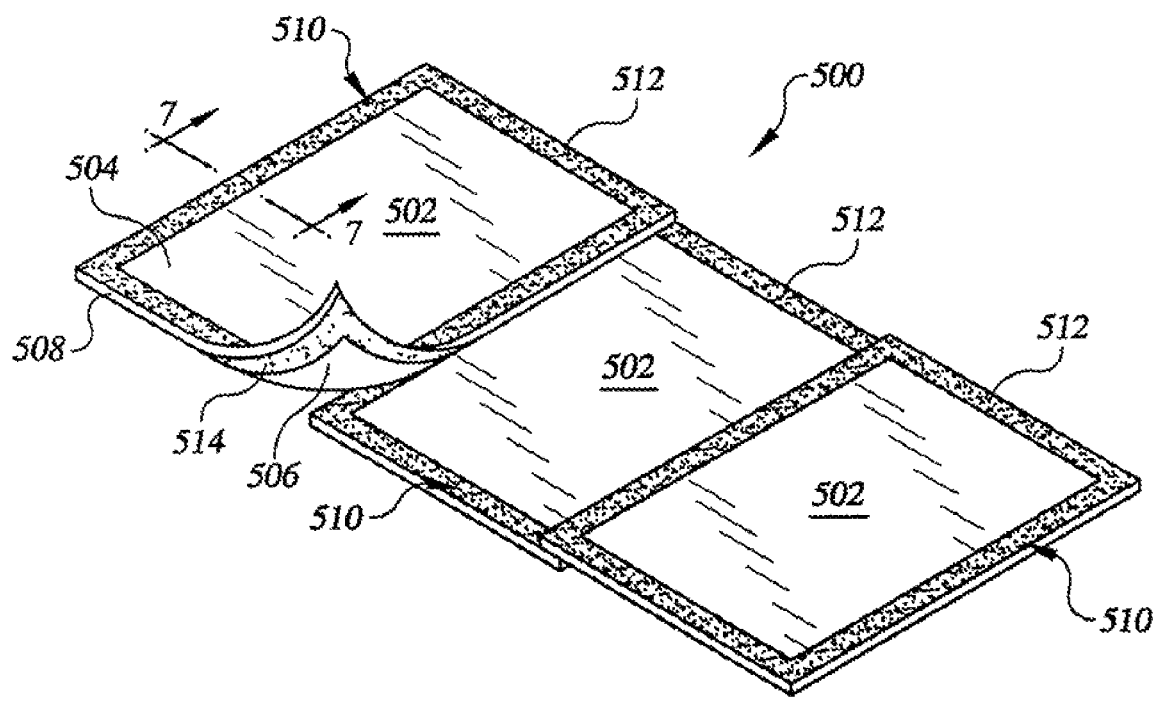
FIG. 6 is a perspective view showing an embodiment of the protective cover of the present invention comprising a plurality of panels removably secured to one another.
Figure 7:
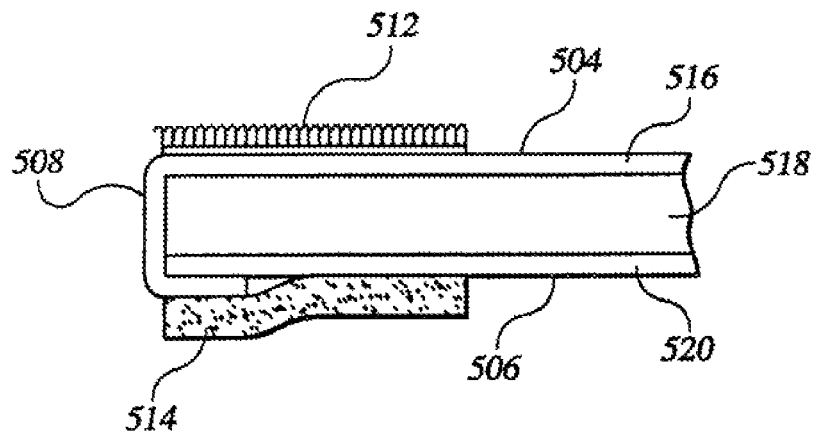
FIG. 7 is an enlarged cross-sectional view of one of the peripheral edges of one of the panels taken along line 7-7 of FIG. 6.

FIGS. 6 and 7 show a cover 500 according to the present invention, wherein the cover is panelized into a number of discrete panels, each denoted 502 and having an outer surface 504, an inner surface 506, and a peripheral edge 508. Panels 502 may be removably secured to one another, and to other panels (not shown) of similar construction, with fasteners 510 located adjacent peripheral edge 508 of cover 500. Panelization allows cover 500 of the present invention to be assembled to fit the size and shape necessary for a particular application. To further enhance customization, one or more of the panels may be formed into a shape other than the rectangular shapes shown in FIG. 6. Panels 502 may be any size desired to suit a particular application, with smaller size panels typically, but not necessarily, being used to conform cover 500 to highly contoured surfaces. For example, for relatively large objects having regions of high contour, panels 502 may be on the order of 1 ft$^2$ (0.093 m$^2$). Of course, panels 502 may be larger or smaller depending upon the application, and different panels within cover 500 may differ in size from one another. Larger panels 502 may be on the order of 100 ft$^2$ (9.290 m$^2$), 1,000 ft$^2$ (92.903 m$^2$), or more.

Fasteners 510 may be of the hook-and-loop type, which typically includes a flexible hook strip 512 and a flexible loop strip 514. Hook strip 512 and loop strip 514 may alternately be secured to outer and inner surfaces 504, 506 adjacent peripheral edge 508 so that when the peripheral edge of one panel is overlaid the peripheral edge of another panel the hook and loop strips engage one another to secure the panels to one another. Loop strip 508 may be liquid-permeable so that its presence does not interfere with the moisture absorbing properties of cover 500 at its peripheral edge 508. Such hook-and-loop fasteners may be VELCRO® brand hook-and-loop fasteners (Velcro Industries B.V., Curacao, Netherlands) or the like. Alternatively, other types of fasteners such as buttons, zippers, snaps, hook and eyelet, eyelet and lacing, among others, may be used for fasteners 504 or the panels may be sewn together.

In the embodiment shown, each panel 502 comprises a three-layer structure of a liquid-impermeable outer layer 516, a moisture-absorbing intermediate layer 518 and, a liquid-permeable inner layer 520, which are identical, respectively, to layers 204, 206, 202 of cover 200 of FIG. 3. However, those skilled in the art will readily appreciate that each panel 502 may have any other construction, such as the construction of covers 300, 400, and 600, described above and below. In this connection, each panel 502 may include any combination of layers and/or features described herein desired to suit a particular application.

Figure 8A:
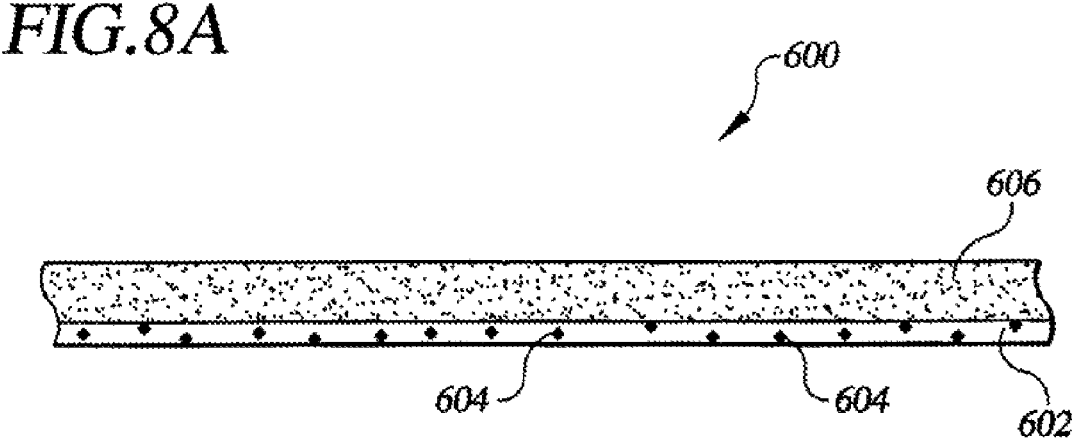
FIGS. 8A-C are each an enlarged cross-sectional view of a portion of other alternative embodiments of the protective cover system of the present invention.

FIG. 8A shows another cover 600 of protective cover system 100 of the present invention. Cover 600 may include a water-vapor-permeable layer 602 and at least one corrosion inhibitor 604. Water-vapor-permeable layer 602 may be made of any suitable porous or non-porous water-vapor-permeable material, which includes the expanded polytetrafluoroethylene, copolyether ester, copolyether amide, and tetrafluoroethylene/sulfonic acid materials described above in connection with liquid-impermeable layer 204 of cover 200 (FIG. 3), among others. A non-porous water-vapor-permeable layer 602 may have a functional advantage over conventional porous liquid-impermeable materials in that not only do these non-porous materials prevent the passage of liquid water through the layer, but they typically also prevent molecules of corrosion inhibitor 604 from passing therethrough. Most conventional porous water-vapor-permeable layers allow at least the smallest molecules of corrosion inhibiting materials to pass through them.

Typically, but not necessarily, water-vapor-permeable layer 602 is a relatively thin layer, often on the order of about 5 microns to about 100 microns, or greater, thick. Such a thin layer is generally not practicable for use as a stand-alone protective layer, particularly for large protective covers subject to harsh weather elements. Therefore, cover 600 may also include a support layer 606, which may be made of a relatively durable and water-vapor-permeable material to provide a generally robust, but breathable, outer shell. Support layer 606 may be continuously bonded to liquid-impermeable layer and may be made of any suitable porous material, such as the woven, film, knit, foam, felt, melt-blown, spunbond, cast, extruded, molded, and expanded materials described above in connection with liquid-permeable layer 202 and liquid impermeable 204 layer of cover 200 (FIG. 3), among others.

Figure 8B:
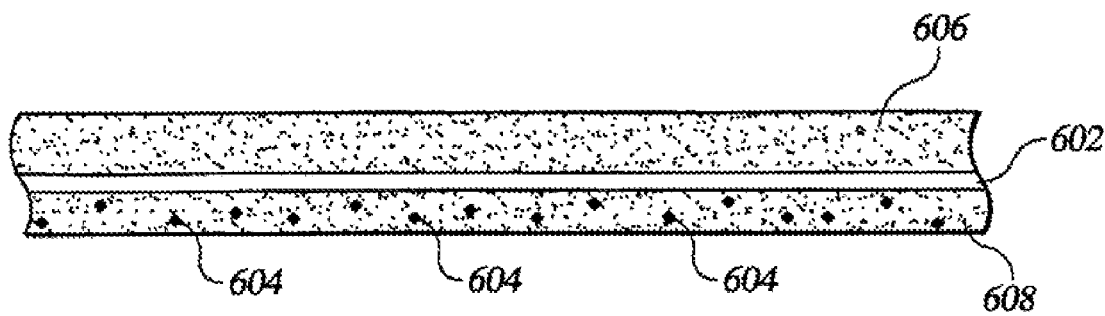

Corrosion inhibitor 604 may be any one or more corrosion inhibiting materials, including the corrosion inhibiting materials noted above with respect to corrosion inhibitor 214 of cover 200. Like corrosion inhibitor 214, corrosion inhibitor 604 may be provided to cover 600 in any one of a number of ways. For example, FIG. 8A shows corrosion inhibitor 604 as being incorporated into water-vapor-permeable layer 604. This may be accomplished, e.g., by adding one or more corrosion inhibiting materials to the resin of water-vapor-permeable layer 604. Resin/corrosion inhibitor blending is discussed above in the context of VCIs in connection with cover 200. Similarly, FIG. 8B shows corrosion inhibitor 604 as being incorporated into an optional liquid- and/or vapor-permeable layer 608 located adjacent the interior face of water-vapor-permeable layer 602, e.g., by blending one or more corrosion inhibiting materials with the resin of layer 608. Layer 608 may be attached to layer 602 either continuously or intermittently, or may not be attached to layer 602 at all, except perhaps at the outer periphery (not shown) of cover 600.

Figure 8C:
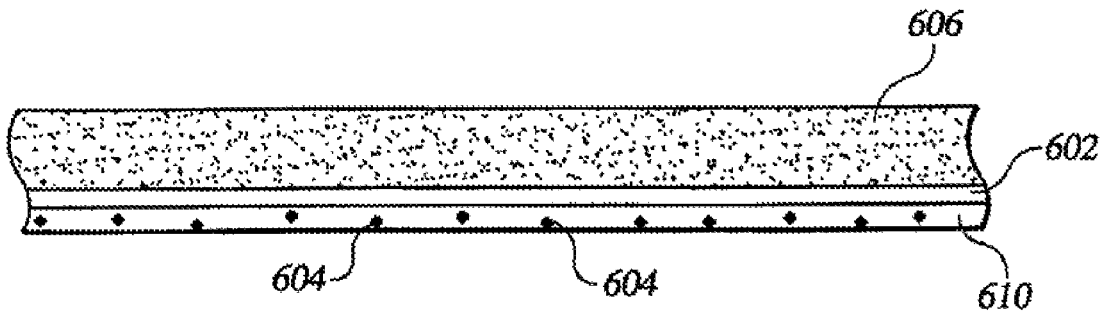

FIG. 8C shows corrosion inhibitor 604 as being incorporated into a coating 610 applied to cover 600, e.g., to water-vapor-permeable layer 602. Depending upon the permeability of coating 610, the coating may be applied either continuously or intermittently such that water-vapor-permeable layer 602 can provide its vapor-transport function. Coating 610 may comprise any one or more of the corrosion inhibiting materials identified above, or other corrosion inhibiting material(s), in a binder suitable for being applied to cover 600 as a coating.

FIG. 9 shows corrosion inhibitor 604 contained in separate corrosion inhibitor source 612. Corrosion inhibitor source 612 may be any suitable source, other than layers 602, 606, 608 and coating 610 described above, for holding and releasing one or more corrosion inhibiting materials into the microenvironment defined by cover, e.g., regions 116 of FIG. 2. For example, corrosion inhibitor source 612 may comprise a container 614 and a closure 616 suitably secured to the container. Closure 616 and/or container 614 may include one or more apertures 618 for allowing corrosion inhibitor 604 to escape therefrom and into the microenvironment beneath cover 600. Corrosion inhibitor source 612 may be placed anywhere it may be in communication with the microenvironment, e.g., by placing it in one of interior regions 116, so that corrosion inhibitor 604 may enter the microenvironment and provide protection to metallic object 110 (FIG. 2). If desired, corrosion inhibitor source 612 may be located outside the microenvironment and placed into communication with the microenvironment using one or more ducts or other conduits (not shown) that communicate with the microenvironment.

Depending upon the size of the object to be protected and/or the arrangement of the microenvironment, e.g., the microenvironment may include interior regions 116 (FIG. 2) not in fluid communication with one another, more than one corrosion inhibitor source 612 may be used. Corrosion inhibitor source 612 may optionally be provided with a seal 620 or other means for opening apertures 618 to allow corrosion inhibitor 604 to escape. Seal 620 may be removed just prior to corrosion inhibitor source 612 being placed into the microenvironment.

Like cover 300 of FIG. 4, discussed above, that contains radar-influencing layer 308, any of the embodiments of cover 600 shown in FIGS. 8A-D may contain a radar-influencing layer containing one or more radar-reflecting and/or radar-absorbing materials, such as materials 310, 312 mentioned above in connection with cover 300. Such a radar-influencing materials may be located in any of layers 602, 606, 608, or coating 610, or may be provided in a layer separate from these layers and located on either side of water-vapor-permeable layer 602. Those skilled in the art will readily understand how one or more radar influencing materials may be incorporated into cover 600 such that a detailed explanation need not be provided in detail herein.

In each of the above exemplary embodiments of the cover system of the present invention, the extent of the various layers was not described with particularity. For example, the discussion of moisture absorbing layer 206 in the context of cover 200 and FIG. 3 directed to this embodiment did not particularly indicate whether or not the moisture-absorbing layer is coextensive with liquid-permeable layer 202 and/or liquid-impermeable layer 204. As those skilled in the art will appreciate, the various layers of a cover according to the present invention may be coextensive with the area of the cover, but may also be smaller in area than the cover. For example, in FIG. 3 just mentioned, moisture-absorbing layer 206 and/or liquid-permeable layer 202 may extend over only a portion of liquid-impermeable layer 204. In addition, moisture-absorbing layer 206 and/or liquid-permeable layer 202 may be "discretized" so as to be present in certain spaced locations that may or may not correspond to particular locations, e.g., flat water-retaining surfaces, of the object to be covered.

Although those skilled in the art will immediately recognize the variety of arrangements that these discretized locations may have, examples of "regular" arrangements include a "window-pane" arrangement, wherein rectangular regions of moisture-absorbing and/or liquid-permeable layers are separated by regions where the materials/characteristics of these layers are not present, and a "striped" arrangement, wherein the cover includes strips where the materials/characteristics of the moisture-absorbing and/or liquid-permeable layers are alternatingly present and not present. This type of discretization of the moisture-absorbing and liquid-permeable layers is applicable to any embodiment containing such layers. Other layers, such as a separate corrosion inhibitor layer or a radar-influencing layer, may be discretized in a similar manner in any embodiment containing such layer(s). Of course, alternatively these layers, too, may be coextensive with the cover. Similarly, in embodiments wherein a corrosion inhibitor, radar-influencing material, or other material is incorporated into one or more of the liquid-impermeable, moisture-absorbing, and/or liquid-permeable layers, as the case may be, the corrosion inhibitor or radar-influencing material may be placed in discretized locations with respect to the area of the corresponding cover.

Although the invention has been described and illustrated with respect to the exemplary embodiments thereof, it should be understood by those skilled in the art that the foregoing and various other changed, omissions and additions may be made therein and thereto, without parting from the spirit and scope of the present invention.

What is claimed is:

1. A panelized cover system for protecting an object from moisture, comprising:
   a plurality of panels each comprising:
      a first layer having a first face and a second face, said first layer comprising a superabsorbent material adapted to absorb and store the moisture;
      a second layer located adjacent said first face of said first layer, said second layer being liquid-impermeable; and
      a vapor corrosion inhibitor source;
   wherein each of said plurality of panels is fastened to at least one adjacent one of said plurality of panels.

2. The panelized cover system of claim 1, wherein adjacent ones of said plurality of panels are fastened to one another with a refastenable fastener.

3. A panelized cover system for protecting an object by forming a microenvironment adjacent the object when the panelized cover system is applied to the object, comprising:
   a plurality of panels each comprising:
      a first layer having a first face and a second face and comprising a liquid-impermeable water-vapor-permeable material;
      a second layer continuously attached to said first layer at said first face of said first layer and being made of a porous material;
      a third layer located adjacent to either said first layer or said second layer, said third layer comprising a superabsorbent material adapted to absorb and store moisture from within the microenvironment; and
   a corrosion inhibitor source for providing at least one corrosion inhibitor to the microenvironment when the panelized cover system is applied to the object;
   wherein each of said plurality of panels is fastened to at least one adjacent one of said plurality of panels.

4. The panelized cover system of claim 3, wherein said corrosion inhibitor source is incorporated into ones of said plurality of panels.

5. The panelized cover system of claim 3, wherein adjacent ones of said plurality of panels are fastened to one another with a refastenable fastener.

* * * * *